United States Patent
Grasso et al.

(10) Patent No.: US 9,002,534 B2
(45) Date of Patent: Apr. 7, 2015

(54) SYSTEM FOR IDENTIFYING THE COMPONENTS OF A VEHICLE

(75) Inventors: Giuseppe Grasso, San Giovanni La Punta (IT); Viviana Oliva, legal representative, San Giovanni La Punta (IT); Davide Giuseppe Patti, Catania (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 13/232,604

(22) Filed: Sep. 14, 2011

(65) Prior Publication Data

US 2012/0123611 A1 May 17, 2012

Related U.S. Application Data

(63) Continuation of application No. 13/075,831, filed on Mar. 30, 2011, now abandoned.

(30) Foreign Application Priority Data

Mar. 30, 2010 (IT) .............................. MI2010A0527

(51) Int. Cl.
*G06F 21/00* (2013.01)
*B60R 25/00* (2013.01)

(52) U.S. Cl.
CPC ...................................... *B60R 25/00* (2013.01)

(58) Field of Classification Search
CPC .................................. G06F 21/00; G06F 21/30
See application file for complete search history.

(56) References Cited

U.S. PATENT DOCUMENTS

| | | | | |
|---|---|---|---|---|
| 5,521,588 A | * | 5/1996 | Kuhner et al. | 340/12.28 |
| 5,661,473 A | * | 8/1997 | Paschal | 340/10.1 |
| 5,890,807 A | | 4/1999 | Igel et al. | |
| 5,991,673 A | * | 11/1999 | Koopman et al. | 701/29.6 |
| 6,317,026 B1 | * | 11/2001 | Brodine | 340/5.8 |
| 6,678,606 B2 | * | 1/2004 | Akins et al. | 701/114 |
| 6,840,445 B2 | * | 1/2005 | Gatz | 235/385 |
| 6,888,462 B2 | * | 5/2005 | Brodine | 340/568.1 |
| 7,039,511 B1 | * | 5/2006 | Kreuz et al. | 701/36 |
| 7,042,346 B2 | * | 5/2006 | Paulsen | 340/438 |

(Continued)

FOREIGN PATENT DOCUMENTS

| | | |
|---|---|---|
| DE | 10021811 A1 | 11/2001 |
| DE | 102005000999 A1 | 8/2005 |

(Continued)

*Primary Examiner* — Jonathan M Dager
(74) *Attorney, Agent, or Firm* — Seed IP Law Group PLLC

(57) ABSTRACT

A system for identifying a plurality of components of a vehicle that includes a plurality of non-volatile memories for storing identifiers associated with the plurality of vehicle components, a controller of the plurality of the vehicle components, a communication network configured for connecting the controller to the plurality of memories, and an identifiers memory including a portion to store a list of a plurality of type-approved identifiers associated with the plurality of type-approved vehicle components. The controller receives the identifiers, reads from the portion of the identifiers memory the list of type-approved identifiers, and checks if the identifiers of the plurality of components are included in the list of the type-approved identifiers, and when the controller detects that an identifier associated with a component out of the plurality of components is not included in the list, the controller blocks operation of the component.

12 Claims, 6 Drawing Sheets

(56) References Cited

U.S. PATENT DOCUMENTS

| | | | |
|---|---|---|---|
| 7,131,005 B2* | 10/2006 | Levenson et al. | 713/170 |
| 7,137,001 B2* | 11/2006 | Dabbish et al. | 713/168 |
| 7,325,135 B2* | 1/2008 | Fehr et al. | 713/170 |
| 7,408,464 B2* | 8/2008 | Brodine | 340/572.1 |
| 7,423,353 B2* | 9/2008 | Hata | 307/10.3 |
| 7,549,046 B2* | 6/2009 | Fehr et al. | 713/168 |
| 7,600,114 B2* | 10/2009 | Reinold et al. | 713/156 |
| 7,684,908 B1* | 3/2010 | Ogilvie et al. | 701/29.6 |
| 7,819,312 B2* | 10/2010 | Gualandri | 235/382 |
| 8,452,465 B1* | 5/2013 | Sinha et al. | 701/2 |
| 8,874,280 B2* | 10/2014 | Doi et al. | 701/1 |
| 2003/0078701 A1* | 4/2003 | Sunami et al. | 701/1 |
| 2005/0035852 A1* | 2/2005 | Paulsen | 340/438 |
| 2005/0096934 A1* | 5/2005 | Wakui et al. | 705/1 |
| 2006/0107058 A1* | 5/2006 | Lewis et al. | 713/176 |
| 2006/0152348 A1* | 7/2006 | Ohtaki et al. | 340/426.1 |
| 2007/0067632 A1* | 3/2007 | Kaihori | 713/169 |
| 2008/0082427 A1* | 4/2008 | Gandhi et al. | 705/28 |
| 2008/0284571 A1* | 11/2008 | Wilbrink et al. | 340/10.1 |
| 2009/0249460 A1* | 10/2009 | Fitzgerald et al. | 726/7 |
| 2009/0288175 A1* | 11/2009 | Sun et al. | 726/35 |
| 2010/0217478 A1* | 8/2010 | Zhang et al. | 701/33 |
| 2011/0119556 A1* | 5/2011 | de Buen | 714/758 |
| 2011/0200193 A1* | 8/2011 | Blitz et al. | 380/277 |

FOREIGN PATENT DOCUMENTS

| | | |
|---|---|---|
| DE | 102005024818 A1 | 11/2006 |
| EP | 0899161 A1 | 3/1999 |
| EP | 1118514 A1 | 7/2001 |
| EP | 2042379 A2 | 4/2009 |
| EP | 2119606 A1 | 11/2009 |

* cited by examiner

SYSTEM FOR IDENTIFYING THE COMPONENTS OF A VEHICLE

BACKGROUND

1. Technical Field

The present disclosure generally relates to the automotive field. More particularly, the present disclosure relates to a system for identifying the components of a vehicle.

2. Description of the Related Art

It is known that motor-vehicles have several mechanical-electronic components mounted thereon, such as ECU (Electronic Control Units) units, ABS (Anti-lock Brake System), ESP (Electronic Stability Control), airbag, active suspensions, transmission control sensors, EPS (Electronic Power Steering) sensors, TPMS (Tire Pressure Monitoring Systems) sensors.

The control of these mechanical-electronic components is performed by means of a micro-controller that is connected to the components by means of a communication network, which uses communication protocols such as, for example, CAN (Controller Area Network), LIN (Local Interconnect Network), FlexRay, MOST (Media Oriented Systems Transport); the controller is referred to also as a network "manager".

The mechanical-electronic components are subject to failures or wear and thus they need to be replaced during the vehicle life; using the communication network with standard protocols makes the replacement of the failed or worn-out components with spare parts easier.

It is important to ensure that the failed or worn-out mechanical-electronic components are replaced with type-approved mechanical-electronic spare components, i.e., that have been approved by the vehicle manufacturer because they comply with a predetermined quality level, such as, for example, a determined reliability, safety and compliance with the technical specifications. In fact, a spare component that is not type-approved may compromise the operation of the safety systems or the operation of the engine, because it does not comply with the same quality levels (for example, it does not allow to comply with the air pollution standards).

Moreover, it is important to avoid mounting spare components that were stolen, and it is necessary to check whether they have been really replaced. It is further necessary to check whether wrong spare components or spare components incompatible with the other components have been mounted.

Generally speaking, it is important to check whether the mechanical-electronic components mounted on a vehicle are type-approved, both in case the components were originally mounted (for example, during the manufacturing of the vehicle or before the vehicle is sold), and when the components have been mounted after the vehicle was sold as spare components for replacing failed or worn-out components.

A method for identifying the spare components is disclosed in U.S. Pat. No. 5,991,673, wherein the spare components have a non-volatile memory for storing a vehicle identifier. The inventor has recognized that using a vehicle identifier has the drawback that whether a spare component is original or type-approved cannot be detected. Rather it only allows detection (when the component is mounted on the vehicle) if it does not belong to such a vehicle.

U.S. Pat. No. 5,991,673 discloses the use of an external device (see block 46 in FIG. 1) connected to the vehicle by means of a control port (see block 44 in FIG. 1) and discloses that all the components store a same source identifier, wherein the source may be, for example, the vehicle manufacturer or someone else. Alternatively, the components may store identifiers that are generated by the source identifier by means of a cyclic redundancy code or by means of a hash function. This has the drawback that the use of an external device is required; moreover, in case of identifiers generated by the source identifier by means of a cyclic redundancy code or by means of a hash function, it also has the drawback that it loses information related to the source identifier.

A further description for monitoring the spare components is found in European Patent No. EP 2042379, wherein the spare components (see 100 in FIG. 3) have impressed thereon an information (for example, an identification number of the vehicle, the type of the spare component or a label which identifies the batch of the spare component) which can be read by detection means (62 in FIG. 3) and that can be interpreted by a controller (20 in FIGS. 1-3) external or internal to the vehicle; the information may be impressed into the spare components by means of the storage in a memory (134 in FIG. 5). The inventor has recognized that a drawback of this approach is that it is not able to detect whether a spare component is original or it is type-approved, but it can only check the state of the spare component, such as, for example the source batch, the wear status, the kilometers covered.

U.S. Pat. No. 5,890,807 describes a method for identifying the integrated circuits, wherein the integrated circuit is identified by a code univocally generated from some properties of the integrated circuit. This code is generated by the integrated circuit obtained after the manufacturing and by an analogous integrated circuit used as a spare part. A comparison between the two codes is performed in order to check whether they are equal: if so, the integrated circuit is original. The inventor has recognized that this method may not be used to identify whether the mechanical-electronic components mounted on a vehicle are original or type-approved, but it may be used only to identify the integrated circuits, because it is closely connected to the information that is formed in the integrated circuit on the cutting map of the silicon wafer.

A further approach for identifying the spare components is disclosed in the U.S. Patent Application Publication No. US 2008/0284571, wherein a radio-frequency identifier (RFID) is used, univocally associated with each spare part. This technique has the drawback that it requires an external radio-frequency identifier reader; moreover, it may not be used to identify whether the mechanical-electronic components mounted on a vehicle are original or type-approved, because the identifier of a spare component only allows to check (for example, to the vehicle owner) information about the maintenance which is carried out, such as for example, if the component has been really replaced.

BRIEF SUMMARY

The system according to the present disclosure can check if the components mounted on a vehicle are original and if they are type-approved, i.e., if they have been approved by the vehicle manufacturer because they guarantee a determined quality level, such as for example a determined reliability, safety and compliance with the technical specifications.

Moreover, the system according to the present disclosure can check if, on a vehicle, spare components have been mounted that had been stolen, it can check the real replacement of failed or worn-out components, and it may avoid mounting wrong spare components or spare components which are incompatible with other components.

In accordance with one aspect of the present disclosure, a system for identifying a plurality of components of a vehicle is provided that includes a plurality of non-volatile memories structured to store respective identifiers associated with the plurality of vehicle components; a controller coupled to the plurality of vehicle components; a communication network structured to connect the controller to the plurality of memories; and an identifiers memory, including a portion configured for storing a list of a plurality of type-approved identifiers associated with the plurality of type-approved vehicle components, wherein the type-approved identifiers are different from each other; wherein the controller is structured to: receive, from the plurality of memories through the communication network, the identifiers associated with the plurality of components; read, from the portion of the identifiers memory, the list of the plurality of type-approved identifiers; check if the identifiers associated with the plurality of components are included in the list of the plurality of type-approved identifiers; and in case of detecting that an identifier associated with a component out of the plurality of components is not included in the list, blocking the operation of said component.

In accordance with another aspect of the disclosure, the identifier associated with the component and the plurality of type-approved identifiers are a digital identifier that includes at least one from among the following fields: a field indicating a unique number; a field indicating a date of installation of the component on the vehicle, the name of the garage performing the installation of the component on the vehicle and the name of the person performing the installation of the component on the vehicle; a field indicating the software version used to update the memory associated with the component or indicating the name of the proprietor of the software; a field indicating the date of the last check in the garage of the vehicle component.

In accordance with another aspect of the present disclosure, the system includes a port for accessing the plurality of non-volatile memories from an exterior of the vehicle; a device structured to connect to the port and to read the identifiers from the plurality of non-volatile memories, the device including: another identifiers memory including a portion structured to store another list of a plurality of type-approved identifiers; a processor structured to: receive, from the plurality of memories through the communication network and the port, the identifiers associated with the plurality of components; read, from the portion of the other identifiers memory the other list of type-approved identifiers; check if the components identifiers are included in the other list of the plurality of type-approved identifiers; and generate an alarm in case of detecting that an identifier associated with a component out of the plurality of components is not included in the other list.

In accordance with another aspect of the present disclosure, a vehicle is provided that includes a system for identifying a plurality of elements, the system including; a plurality of non-volatile memories structured to store respective identifiers associated with the plurality of vehicle components; a controller coupled to the plurality of vehicle components; a communication network structured to connect the controller to the plurality of memories; and an identifiers memory, including a portion configured for storing a list of a plurality of type-approved identifiers associated with the plurality of type-approved vehicle components, wherein the type-approved identifiers are different from each other; wherein the controller is structured to: receive, from the plurality of memories through the communication network, the identifiers associated with the plurality of components; read, from the portion of the identifiers memory, the list of the plurality of type-approved identifiers; check if the identifiers associated with the plurality of components are included in the list of the plurality of type-approved identifiers; and in case of detecting that an identifier associated with a component out of the plurality of components is not included in the list, blocking the operation of said component; wherein each component of the plurality of components including a respective memory out of the plurality of non-volatile memories.

In accordance with yet a further aspect of the present disclosure, a method of identifying a plurality of components of a vehicle is provided. The method includes a) storing into a plurality of non-volatile memories respective identifiers associated with the plurality of vehicle components; b) storing into a portion of an identifiers memory a list of a plurality of type-approved identifiers associated with the plurality of type-approved vehicle components, wherein the type-approved identifiers are different from each other; c) at a controller of the plurality of vehicle components, receiving from the plurality of memories the identifiers associated with the plurality of components; d) reading from the portion of the identifiers memory the list of the plurality of type-approved identifiers; e) at the controller, checking if the identifiers associated with the plurality of components are included in the list of the plurality of type-approved identifiers; f) in the case of detecting at the controller that an identifier associated with a component out of the plurality of components is not included in the list, blocking the operation of said component.

In accordance with a further embodiment of the present disclosure, a circuit for vehicles having a plurality of components is provided, the circuit including a memory structured to store identification data associated with respective components; and a processor coupled to the memory and the plurality of components and to communicate with the components and the memory to verify that the components are authorized components and, if not, to provide an error signal.

BRIEF DESCRIPTION OF THE SEVERAL VIEWS OF THE DRAWINGS

Further characteristics and the advantages of the present disclosure will result from the following description of a preferred embodiment and variants thereof provided as a way of example with reference to the attached drawings, wherein.

DETAILED DESCRIPTION

Figure 1:
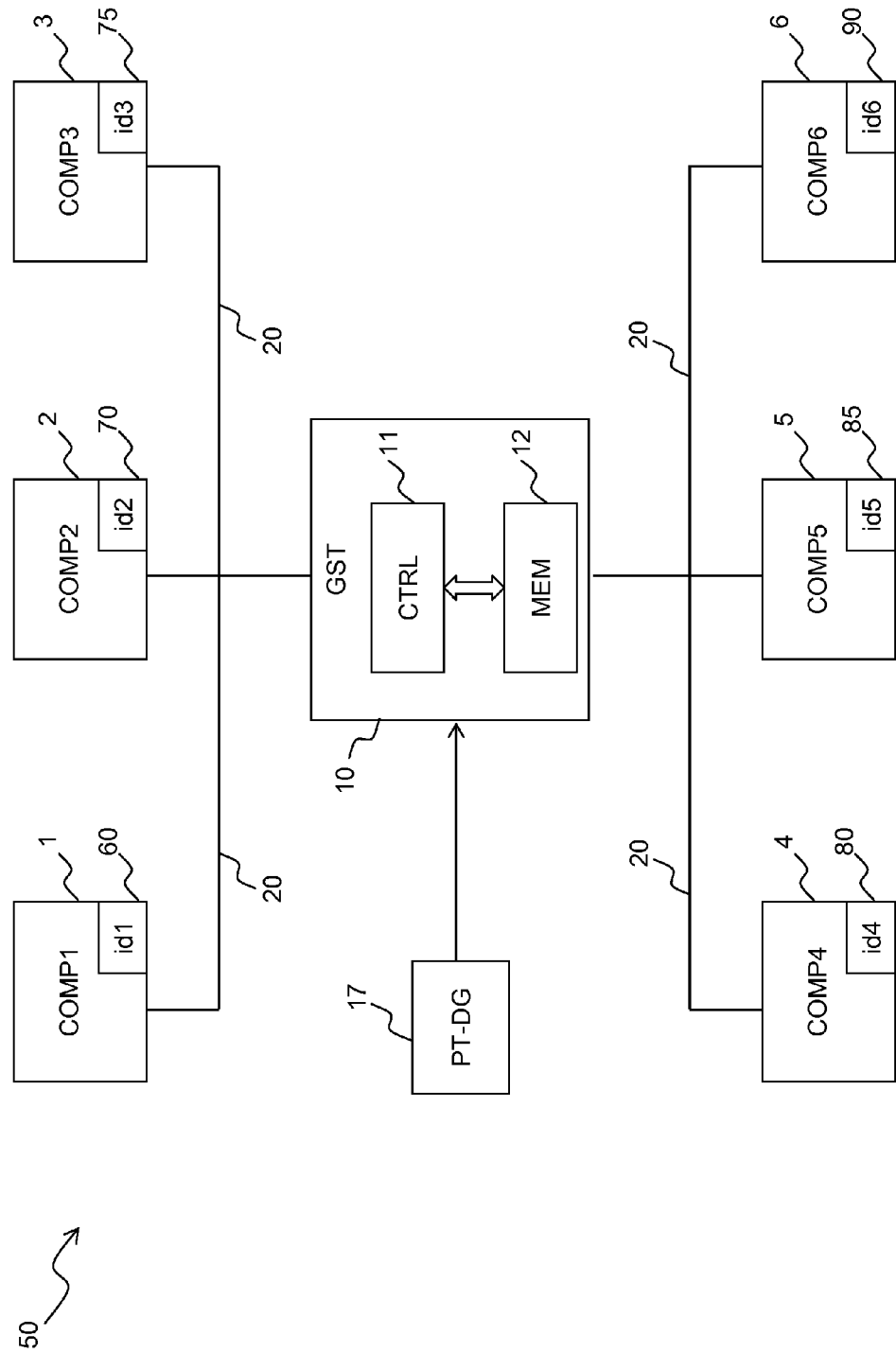
FIG. 1 schematically shows a system for identifying the components of a vehicle according to a first embodiment of the disclosure.

Referring to FIG. 1, a system 50 for identifying the components 1, 2, 3, 4, 5, 6 of a motor vehicle according to a first embodiment of the disclosure is illustrated.

The vehicle may be a motor vehicle, a motor-cycle, a truck, a train, a plane or a ship.

The identification system 50 includes a controller 11, a communication network 20, a plurality of memories 60, 70, 75, 80, 85, 90, and an identifiers memory 12 connected to the controller 11. The identification system 50 is installed on the vehicle on which the components 1, 2, 3, 4, 5, 6 are mounted.

Components 1, 2, 3, 4, 5, 6 are mechanical-electronic components that are mounted on the vehicle and are sensors or actuators, such as, for example:

ECUs (Electronic Control Unit);
ABS (Anti-lock Brake System);
ESP (Electronic Stability Control);
airbag;
active suspensions;
transmission control sensors;
EPS (Electronic Power Steering) sensors;
TPMS (Tire Pressure Monitoring Systems) sensors.

The plurality of memories 60, 70, 75, 80, 85, 90 has the function of storing a corresponding plurality of identifiers id1, id2, id3, id4, id5, id6 associated with the plurality of components 1, 2, 3, 4, 5, 6, respectively.

In particular:
memory 60 is structured to store an identifier id1 associated with the component 1;
memory 70 is structured to store an identifier id2 associated with the component 2;
memory 75 is structured to store an identifier id3 associated with the component 3;
memory 80 is structured to store an identifier id4 associated with the component 4;
memory 85 is structured to store an identifier id5 associated with the component 5;
memory 90 is structured to store an identifier id6 associated with the component 6;

The plurality of memories 60, 70, 75, 80, 85, 90 is associated with the plurality of components 1, 2, 3, 4, 5, 6 respectively. Preferably, the plurality of memories 60, 70, 75, 80, 85, 90 is included as part of the plurality of components 1, 2, 3, 4, 5, 6, i.e., component 1 includes memory 60, component 2 includes memory 70, component 3 includes memory 75, component 4 includes memory 80, component 5 includes memory 85 and component 6 includes memory 90.

Ideally, the plurality of memories 60, 70, 75, 80, 85, 90 is of the non-volatile type, such as for example Flash and EEPROM memories.

The identifiers memory 12 includes a portion 15 (see FIG. 2) that has the function of storing a list of type-approved identifiers, i.e., the list of identifiers associated with the type-approved components (1, 2, 3, 4, 5, 6 in the first embodiment of the disclosure) mounted on the vehicle, that is the components that have been approved by the vehicle manufacturer (for example because they comply with a determined quality level) and have not been stolen, as it will be explained more in detail in the following with reference to FIG. 2.

The communication network 20 has the function of connecting the plurality of memories 60, 70, 75, 80, 85, 90 to the controller 11. For example, the communication network 20 uses communication protocols such as CAN (Controller Area Network), LIN (Local Interconnect Network), FlexRay or MOST (Media Oriented Systems Transport).

The controller 11 is, for example, a microprocessor, external or internal to an integrated circuit (programmable or application-specific). The controller 11 is connected to the plurality of memories 60, 70, 75, 80, 85, 90 by means of the communication network 20; in the case where the plurality of memories 60, 70, 75, 80, 85, 90 is included in the plurality of components 1, 2, 3, 4, 5, 6, the controller 11 is connected to the plurality of components 1, 2, 3, 4, 5, 6.

The controller 11 has the function of controlling, at the time of the vehicle ignition or at determined times during the operation of the vehicle (for example, periodically), if the components mounted on the vehicle are type-approved. In particular, controller 11 is structured to:

receive, from the plurality of memories 60, 70, 75, 80, 85, 90 through the communication network 20, the identifiers id1, id2, id3, id4, id5, id6 associated with the plurality of components 1, 2, 3, 4, 5, 6 respectively;

read, from the portion 15 of the identifiers memory 12, the list of the plurality of type-approved identifiers;

check if the identifiers id1, id2, id3, id4, id5, id6 are included in the list of the plurality of the type-approved identifiers;

in case the controller 11 detects that one of the identifiers id1, id2, id3, id4, id5, id6 is not included in the list, to block the operation of the component associated with the identifier not included in the list.

Preferably, the controller 11 and the identifiers memory 12 are included in a manager circuit 10 of the plurality of components 1, 2, 3, 4, 5, 6.

Advantageously, the identification system 50 includes also a diagnostic port 17 connected to the manager 10 of the plurality of components and structured to provide access from the outside of the vehicle to the plurality of memories 60, 70, 75, 80, 85, 90, as schematically shown in FIG. 1.

The diagnostic port is structured to be connected to an external device (not shown in FIG. 1) that has the function of reading from the plurality of memories the identifiers associated with the plurality of components. In the case of the first embodiment shown in FIG. 2, the external device is structured to read from the memories 60, 70, 75, 80, 85, 90 the identifiers id1, id2, id3, id4, id5, id6 associated with the components 1, 2, 3, 4, 5, 6. The external device includes a processor and another identifiers memory.

In particular, the other identifiers memory includes a portion configured for storing (likewise the identifiers memory 12) another list of a plurality of type-approved identifiers, i.e., (in the first embodiment of the disclosure) the list of identifiers associated with the type-approved components 1, 2, 3, 4, 5, 6 mounted on the vehicle. Moreover, the processor is configured for:

receiving, from the plurality of memories through the communication network and the port, the identifiers associated with the plurality of components;

reading, from the portion of the other identifiers memory the other list of type-approved identifiers;

checking if the components identifiers are included in the other list of the plurality of type-approved identifiers;

generating an alarm in the case of detecting that an identifier associated with a component out of the plurality of components is not included in the other list.

The external device may be used, for example, by the police, who by means of the external device can check if the vehicle stopped during a road check has installed components that are not type-approved or were stolen.

Alternatively, the diagnostic port 17 is structured to be connected to a computer (directly or through a computer network) to allow an insurance company to check if an insured vehicle has installed components that are not type-approved or were stolen. The checking is done by reading the identifiers associated with the components 1, 2, 3, 4, 5, 6 and by comparison with a list of type-approved identifiers.

Alternatively, the vehicle includes a device or circuit structured to transmit to a central station (for example, a police station, an insurance company, a government body) a radio signal (for example, of the radiomobile, GPS, Telepass type) that carries the identifiers associated with the components mounted on the vehicle.

The central station includes a database for storing the list of type-approved identifiers and thus is able to check if nontype-approved or stolen components are mounted on the vehicle by comparing the identifiers associated with the components received from the radio signal to the list of type-approved identifiers stored into the database. In this way it is possible to detect components with associated nontype-approved identifiers or stolen components.

Figure 2:
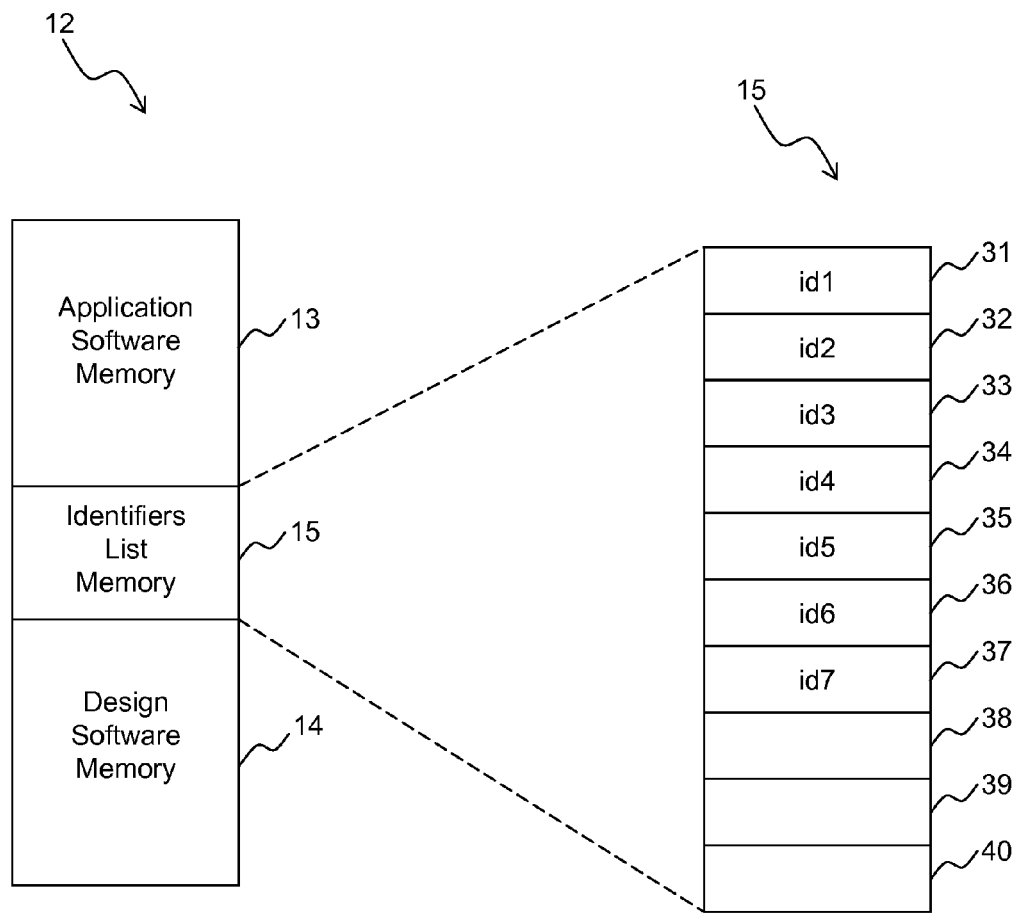
FIG. 2 shows more in detail an identifiers memory according to the first embodiment of the disclosure.

Referring to FIG. 2, shown in more detail is the identifiers memory 12 of the identification system 50 according to a first embodiment of the disclosure. The identifiers memory 12 includes the following memory areas:

a memory area 13 structured to store an application software and parameters specified during the design step;

a memory portion 15 structured to store the list of type-approved identifiers id1, id2, id3, id4, id5, id6, id7, i.e., the list of identifiers associated with the type-approved components out of the plurality of components mounted on the vehicle; and a memory area 14 structured to store an executable application software and parameters specified during the design step;

In particular, the memory portion 15 is structured to store the identifier id1 associated with the type-approved component 1 into the memory area 31. It also stores the identifier id2 associated with the type-approved component 2 into the memory area 32, the identifier id3 associated with the type-approved component 3 into the memory area 33, the identifier id4 associated with the type-approved component 4 into the memory area 34, the identifier id5 associated with the type-approved component 5 into the memory area 35, the identifier id6 associated with the type-approved component 6 into the memory area 36, and the identifier id7 associated with the type-approved component 7 into the memory area 37 (the component 7 is not mounted on the vehicle comprising the system 50).

The type-approved identifiers id1, id2, id3, id4, id5, id6, id7 of the list of identifiers memory 12 have values that are different from each other.

Preferably, the portion 15 of the identifiers memory 12 is of the non-volatile type, for example Flash, EEPROM, ROM type.

It is to be observed that in the first embodiment of the disclosure shown in FIGS. 1 and 2, the portion 15 of the identifiers memory 12 is structured to store the type-approved identifiers associated with all the components 1, 2, 3, 4, 5, 6 mounted on the vehicle. In this case, the identification system 50 is able to detect that all the components mounted on the vehicle (i.e., components 1, 2, 3, 4, 5, 6) are type-approved, i.e., that they have been approved by the vehicle manufacturer (for example, because they comply with the required quality level), as will be explained more in detail below.

Advantageously, when the vehicle is repaired in a garage, the list of the type-approved identifiers stored in the portion 15 of the identifiers memory 12 is updated by storing new identifiers associated with new type-approved components (without deleting the identifiers associated with type-approved components already stored) and deleting the identifiers associated with the stolen components. This allows checking (during the repair in a garage) if the vehicle has mounted on it nontype-approved or stolen components. Analogously, the memory of the external device (connected to the vehicle by means of the diagnostic port 17) is updated with the list of the type-approved identifiers. This allows checking (when the vehicle is stopped by the police during a road control) if the vehicle has mounted on it nontype-approved or stolen components.

Advantageously, the storage of the identifiers into the memories 60, 70, 75, 80, 85, 90 associated with components 1, 2, 3, 4, 5, 6 is of the incremental type, i.e., the memories associated with the components are updated by storing new type-approved identifiers, without deleting the type-approved identifiers already stored. This has the advantage of allowing the traceability of the history of the component, in order to have useful plain text information available related to the past history of the component, such as for example the installation date of the component, the garage wherein the component was installed, the name of the person performing the installation, etc. Moreover, it has the advantage of allowing a check of whether the failed or worn-out component was actually replaced with a spare component, because the spare component has an identifier different from the replaced component.

Figure 3A:
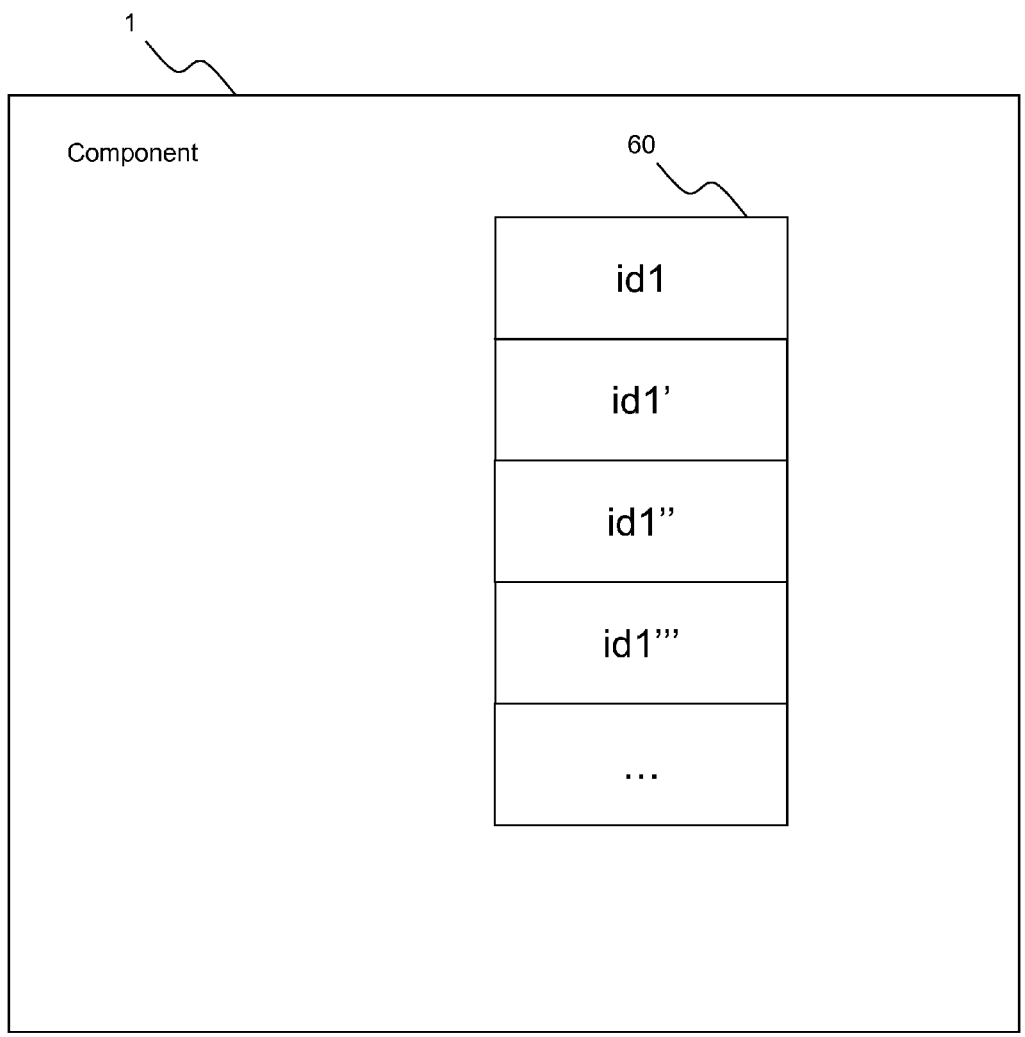
FIG. 3A shows more in detail the memory associated with a component of the vehicle according to the first embodiment of the disclosure.

In particular, in the case where an original component (see 5 in FIG. 1) with an associated original identifier (i.e., assigned by the manufacturer of the original component) is replaced (after a failure or wear) with a first type-approved spare component (see 105 in FIG. 4), to the first type-approved spare component, it is associated with a first type-approved identifier, i.e., different from the original identifier associated with the original component. In this case the memory (see 185 in FIG. 4) associated with the first type-approved spare component is structured to store both the original identifier and the first type-approved identifier. This is shown in FIG. 3A for the component 1, which shows id1, which is the original identifier associated with the original component 1 and shows id1', which is the first type-approved identifier associated with the first type-approved spare component of the original component 1. Moreover, the portion 15 of the identifiers memory 12 is also updated in order to store, in addition to the original identifier id1, the first type-approved identifier id1'.

Analogously, in case the spare component is replaced (after a failure or wear) with a second type-approved spare component, the second type-approved spare component is associated with a second type-approved identifier, i.e., different from the first type-approved identifier associated with the first type-approved spare component. In this case the memory associated with the second original type-approved spare component is structured to store both the original identifier and the first type-approved identifier and the second type-approved identifier. This is shown in FIG. 3A for the component 1, wherein id1 is the original identifier associated with the original component 1, id1' is the first type-approved identifier associated with the first type-approved spare component of the component 1, and id1" is the second type-approved identifier associated with the second type-approved spare component of the component 1. Moreover, the portion 15 of the identifiers memory 12 is also updated in order to store, in addition to the original identifier id1 and the first identifier id1', the second identifier id1".

The spare components are, for example, spare parts of mechanical-electronic type.

The same considerations regarding component 1 about the incremental storage of subsequent identifiers also apply to the components 2, 3, 4, 5, 6.

It will be described hereinafter the operation of the identification system 50 according to the first embodiment of the disclosure d, referring also to FIGS. 1 and 2.

At the starting time, the vehicle on which the system 50 is mounted is started and the controller 11 performs a procedure for identifying if the components 1, 2, 3, 4, 5, 6 mounted on the vehicle are type-approved. Alternatively, the identification procedure may be activated periodically during the operation of the vehicle.

According to the identification procedure, the controller 11 receives (through the communication network 20) from the memories 60, 70, 75, 80, 85, 90 of the components 1, 2, 3, 4, 5, 6 the identifiers id1, id2, id3, id4, id5, id6 associated with the components 1, 2, 3, 4, 5, 6, respectively. Moreover, the controller 11 reads from the portion 15 of the identifiers memory 12 the list of the type-approved identifiers, which in this case are the identifiers id1, id2, id3, id4, id5, id6, id7 (see FIG. 2).

Afterwards, the controller 11 checks if the read values of the identifiers associated with the components 1, 2, 3, 4, 5, 6 are included within the values read from the list of type-approved identifiers.

In this case, the controller 11 detects that the portion 15 stores the identifiers id1, id2, id3, id4, id5, id6 associated with all the components 1, 2, 3, 4, 5, 6 (and it also stores the identifier id7). This indicates that all the components mounted on the vehicle are type-approved, i.e., that the components 1, 2, 3, 4, 5, 6 are original or that they are spare components approved by the vehicle manufacturer (for example, they have been mounted by authorized personnel and they were not stolen).

Preferably, the identifiers associated with the components of the vehicle are of the digital type, i.e., they are represented by a determined number of bits.

Figure 3B:
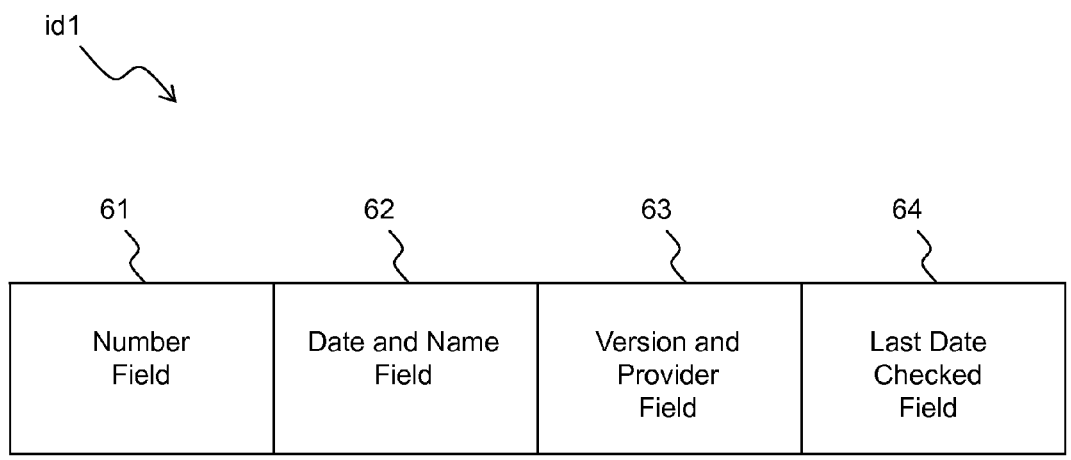
FIG. 3B shows in detail a digital identifier associated with a component of the vehicle.

Referring to FIG. 3B, it is shown more in detail a digital identifier id1 associated with component 1. The digital identifier id1 includes the following fields:

a field 61 composed of n bits indicating a unique number (for example, a progressive number);

a field 62 composed of m bits indicating the date of installation of the component 1, the name of the garage performing the installation or the name of the person performing the installation;

a field 63 composed of k bits indicating the software version used to update the memory 60 of the component 1 or indicating the name of the proprietor of the updated software;

a field 64 composed of h bits indicating the date of the last check in the garage of the component 1.

Figure 4:
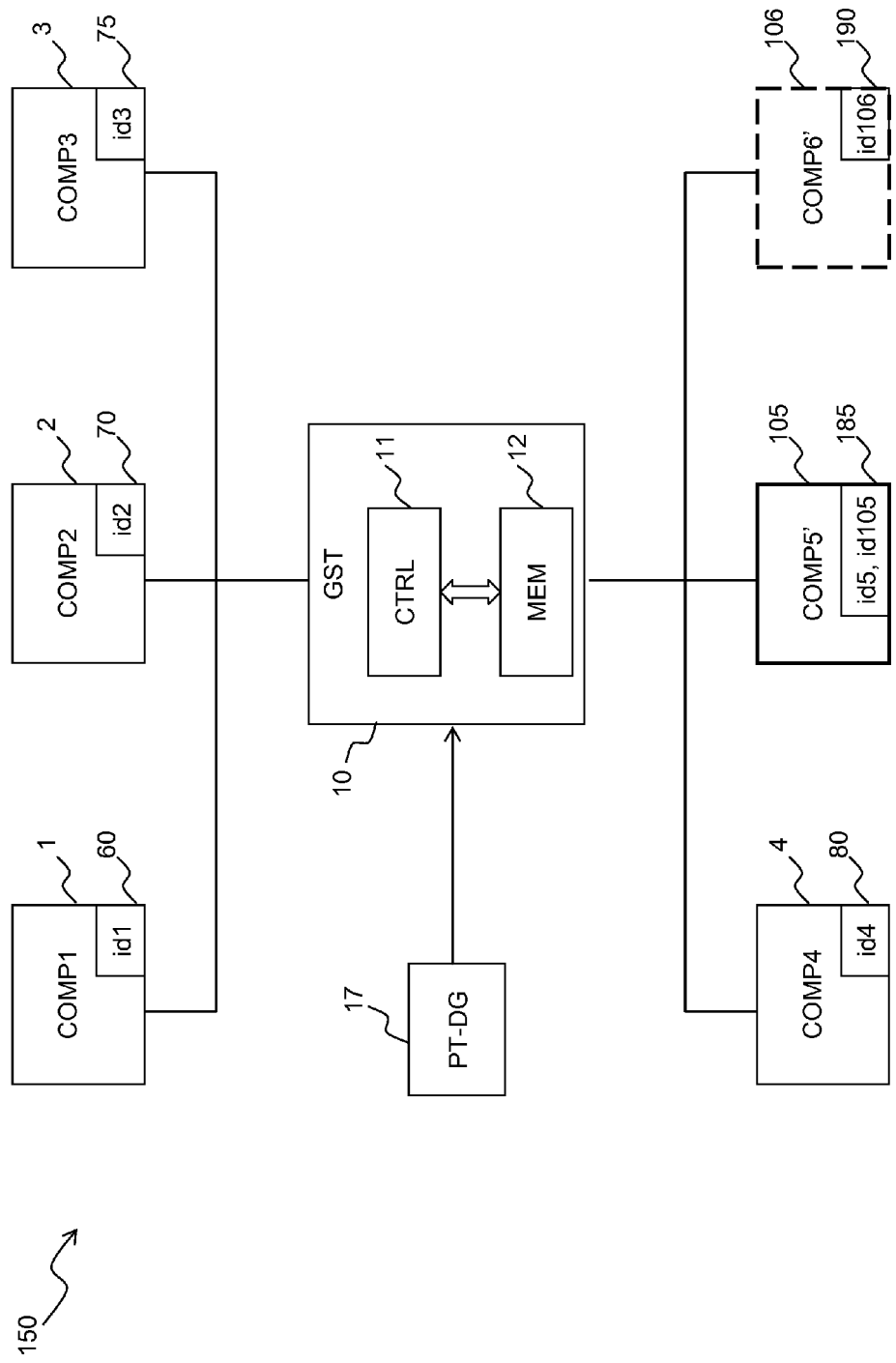
FIG. 4 schematically shows an identification system according to a second embodiment of the disclosure.
Figure 5:
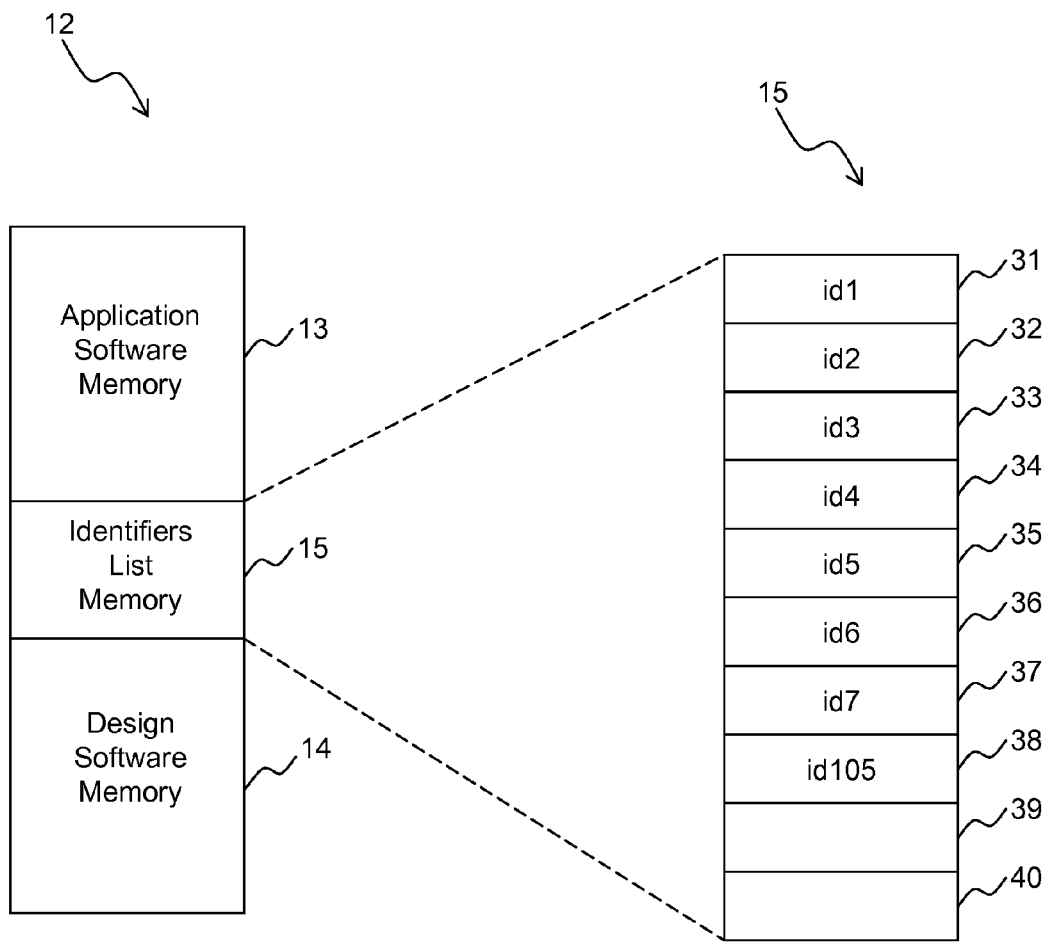
FIG. 5 shows more in detail the identifiers memory according to the second embodiment of the disclosure.

Referring to FIG. 4, shown therein is an identification system 150 according to a second embodiment of the disclosure. The system 150 is obtained from the system 50 according to the first embodiment of the disclosure, wherein the spare component 105 replaces the original component 5 and the spare component 106 replaces the original component 6, for example because the components 5 and 6 are worn-out or failed. It is assumed that the spare component 105 is type-approved, whereas the spare component 106 is a nontype-approved component. Thus it is indicated with a dashed line in FIG. 4. Moreover, the content of the identifiers memory 12 is partially different in respect to the portion 15, as schematically shown in FIG. 5. In particular, after the replacement of the components 5 and 6 with the spare components 105 and 106, the content of the portion 15 of the identifiers memory 12 is updated, by storing the value of the identifier id105 associated with the type-approved spare component 105 in addition to the identifiers id1, id2, id3, id4, id5, id6, id7 already stored, as schematically shown in FIG. 5. Differently, the value of the identifier id106 associated with the nontype-approved spare component 106 is not stored into the portion 15 of the identifiers memory 12.

Therefore the systems 50 and 150 show the same identification system at different times, wherein the system 150 shows the system at a time subsequent to the one of the system 50. Therefore similar blocks are indicated in FIG. 4 with the same reference numbers as in FIG. 1.

The spare component 105 has the same function as the component 5 and the spare component 106 has the same function as the component 6.

The spare component 105 includes a memory 185 structured to store the identifier id105 associated with the original component 105 (and, preferably, structured to store also the identifier id5 associated with the original component 5 which is replaced, as schematically shown in FIG. 4). The spare component 106 includes a memory 190 structured to store the identifier id106 associated with the nontype-approved spare component 106.

The system 150 includes an identifiers memory 12, whose content is shown more in detail in FIG. 5. In particular, the identifiers memory 12 includes the portion 15, which is structured to store the list of type-approved identifiers. In particular, the portion 15 of the identifiers memory 12 is structured to store the identifier id1 associated with the type-approved component 1 in the memory area 31, it is structured to store the identifier id2 associated with the type-approved component 2 in the memory area 32, it is structured to store the identifier id3 associated with the type-approved component 3 in the memory area 33, it is structured to store the identifier id4 associated with the type-approved component 4 in the memory area 34, it is structured to store the identifier id5 associated with the type-approved component 5 (no longer present in the system 50) in the memory area 35, it is structured to store the identifier id6 associated with the type-approved component 6 (no longer mounted on the vehicle comprising the system 50) in the memory area 36, and it is structured to store the identifier id7 associated with the type-approved component 7 (not mounted on the vehicle comprising the system 50) in the memory area 37, and it is structured to store the identifier id105 associated with the type-approved spare component 105 into the memory area 38.

Since the portion 15 of the identifiers memory 12 is structured not to store the identifier id106 associated with the nontype-approved spare component 106, the identification system 150 is capable of detecting that at least one vehicle component (in this case, the spare component 106) is not original or type-approved, as will be explained more in detail below.

As indicated above, the system 150 is obtained from the system 50 according to the first embodiment of the disclosure, wherein the spare component 105 replaces the component 5 and the spare component 106 replaces the component 6.

It will be described hereinafter the operation of the identification system 150 during the repairing step, referring also to FIGS. 1, 4 and 5.

The original component 5 is replaced by the type-approved spare component 105. Both the identifier id5 and the identifier id105 are written into the memory 185 and the type-approved identifier id105 is written into the portion 15 of the identifiers memory 12 in the memory area 38.

Moreover, the original component 6 is replaced by the not type-approved spare component 106. The identifier id106 is written into the memory 190.

It will be described hereinafter the operation of the identification system 150 according to the second embodiment of the disclosure after repairing, referring also to FIGS. 4 and 5. The vehicle on which the system 150 is mounted is started, and the controller 11 performs the procedure for determining if the components 1, 2, 3, 4, 105, 106 mounted on the vehicle are type-approved.

According to the identification procedure, the controller 11 reads (by means of the communication network 20) from the memories 60, 70, 75, 80, 85, 90 of the components 1, 2, 3, 4, 5, 6 the identifiers id1, id2, id3, id4, id105, id106 associated with the components 1, 2, 3, 4, 105, 106, respectively. Moreover, the controller 11 reads from the portion 15 of the identifiers memory 12 the list of type-approved identifiers, which in this case are the identifiers id1, id2, id3, id4, id5, id6, id105 (see FIG. 5).

Afterwards, the controller 11 checks if the read values of the identifiers associated with the components 1, 2, 3, 4, 105, 106 are included within the values read from the list of type-approved identifiers. In this case, the controller 11 detects that the portion 15 stores the type-approved identifiers id1, id2, id3, id4, id105 associated with the type-approved components 1, 2, 3, 4, 105 respectively, whereas it does not store the identifier id106 associated with the nontype-approved spare component 106.

The controller 11 then detects that the spare component 106 mounted on the vehicle is not type-approved, i.e., the spare component 106 is not original or it is not a spare component approved by the vehicle manufacturer (for example, the spare component 106 was not mounted by not authorized personnel or it was stolen). As a result, the controller 11 generates a signal that blocks the operation of the spare component 106 and, preferably, the controller 11 also generates an alarm signal (for example, it switches on a warning light on the vehicle dashboard) for signalling the presence of a non-type-approved spare component. Alternatively, the controller 11 blocks the start of the vehicle.

The present disclosure also provides a method for identifying the plurality of components of a vehicle. The method includes the steps of:

a) storing into a plurality of non-volatile memories identifiers associated with the plurality of vehicle components, respectively;

b) storing into a portion of an identifiers memory a list of a plurality of type-approved identifiers associated with the plurality of type-approved vehicle components, wherein the type-approved identifiers are different from each other;

c) at a controller of the plurality of the vehicle components, receiving from the plurality of memories the identifiers associated with the plurality of components;

d) reading from the portion of the identifiers memory the list of the plurality of type-approved identifiers;

e) at the controller, checking if the identifiers associated with the plurality of components are included in the list of the plurality of type-approved identifiers;

f) in the case of detecting at the controller that an identifier associated with a component out of the plurality of components is not included in the list, blocking the operation of said component.

Preferably, the method further includes, before step a), the step of replacing a component out of the plurality of components with a spare component, wherein the step a) includes storing into a memory out of the plurality of memories the identifier associated with the replaced component and storing an identifier associated with the spare component.

Preferably, step b) further includes storing into the portion of the identifiers memory the identifier associated with a type-approved spare component. Preferably, step b) further includes the step of deleting from the portion of the identifiers memory the identifier associated with a stolen spare component.

The method according to the present disclosure can be performed by means of a computer program that includes software code and carried out within the controller 11, which can be a separate micro-processor or can be a micro-processor inside a specific or programmable integrated circuit (for example, a FPGA=Field Programmable Gate Array). The programming language used for the software program code may be for example C language.

In particular, the computer program performs the steps c), d), e), f) of the method for identifying the plurality of components of the vehicle.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A system, comprising:
   a plurality of memories configured to store respective unique identifiers associated respectively with a plurality of vehicle components and spare components, the plurality of memories including a vehicle component identifier memory configured to store a vehicle component identifier associated with a respective vehicle component of the plurality of vehicle components and further configured to store each spare component identifier associated with each spare component that has replaced the respective vehicle component;
   a first identifiers memory configured to store a first list of type-approved vehicle component identifiers associated with a plurality of type-approved vehicle components and type-approved spare component identifiers associated with type-approved spare components;
   a controller configured to:
      receive from the plurality of memories respective vehicle component and spare component identifiers;
      read from the first identifiers memory the first list of type-approved vehicle component and type-approved spare component identifiers;
      detect if a vehicle component or spare component identifier received from the plurality of memories is included in the first list of the type-approved vehicle component and type-approved spare component identifiers read from the first identifiers memory; and
      block operation of the vehicle in response to detecting that the received vehicle component or spare component identifier is not included in the first list of type-approved vehicle component and spare component identifiers received from the first identifiers memory; and
   a hardwired communication network configured to directly connect the plurality of memories to the controller.

2. The system according to claim 1, wherein each vehicle component and spare component identifier and each of the type-approved vehicle component and spare component identifiers is a digital identifier that includes at least one from among the following bit fields:
   a field indicating a unique number;
   a field indicating a date of installation of the vehicle component or spare component on the vehicle, a name of a facility performing installation of the vehicle component or spare component on the vehicle or a name of a person performing the installation of the vehicle component or spare component on the vehicle;
a field indicating a software version used to update the memory associated with the vehicle component or spare component or indicating a name of a proprietor of the software version;
a field indicating a date of a last check in the facility of the vehicle component or spare component.

3. The system of claim 1, further including:
a port configured to access the plurality of memories from an exterior of the vehicle;
a device configured to connect to the port and to read the vehicle component and spare component identifiers from the plurality of memories, the device including:
  a second identifiers memory including a portion configured to store a second list of type-approved vehicle component and spare component identifiers;
  a processor configured to:
    receive from the plurality of memories the vehicle component and spare component identifiers;
    read from the portion of the second identifiers memory the second list of type-approved vehicle component and spare component identifiers;
    if the received vehicle component and spare component identifiers are not included in the second list of type-approved vehicle component and spare component identifiers; and
    generate an alarm signal in response to detecting that a received vehicle component and spare component identifier associated with a vehicle component or spare component is not included in the second list.

4. The system of claim 1 wherein the vehicle components and spare components are mechanical-electronic spare parts.

5. A vehicle, comprising:
a system structured to identify vehicle components and spare components, the system including:
  a plurality of memories configured to store vehicle component and spare component unique identifiers associated with the vehicle components and spare components respectively, the plurality of memories including a vehicle component identifier memory configured to store at least one vehicle component identifier associated with a vehicle component of the plurality of vehicle components and further configured to store each spare component identifier associated with each spare component that has replaced the respective vehicle component;
  a first identifiers memory configured to store a first list of type-approved vehicle component and spare component identifiers associated with type-approved vehicle components and spare components respectively;
  a controller configured to be coupled to the vehicle components and spare components, the controller configured to:
    receive from the plurality of memories vehicle component and spare component identifiers associated with the respective vehicle components and spare components;
    read from the first identifiers memory the first list of the type-approved vehicle component and spare component identifiers;
    detect if a received vehicle component or spare component identifier received from the plurality of memories is not included in the first list of type-approved vehicle component and spare component identifiers; and
    block operation of the vehicle in response to detecting that a respective received vehicle component or spare component identifier is not included in the first list of type-approved vehicle component and spare component identifiers; and
  a hardwired communication network that directly connects the plurality of memories to the controller.

6. The vehicle according to claim 5, wherein each vehicle component and spare component identifier and each of the plurality of type-approved vehicle component and spare component identifiers is a digital identifier that includes at least one from among the following bit fields:
a field indicating a unique number;
a field indicating a date of installation of the vehicle component or spare component on the vehicle, a name of a facility performing installation of the vehicle component or spare component on the vehicle or a name of a person performing the installation of the vehicle component or spare component on the vehicle;
a field indicating a software version used to update the memory associated with the vehicle component or spare component or indicating a name of a proprietor of the software version; and
a field indicating a date of a last check in the facility of the vehicle component or spare component.

7. The vehicle of claim 5, further including:
a port configured to enable access to the plurality of non-volatile memories from an exterior of the vehicle; and
a device configured to couple to the port and to read the vehicle component and spare component identifiers from the plurality of memories, the device including:
  a second identifiers memory including a portion structured to store a second list of a plurality of type-approved vehicle component and spare component identifiers;
  a processor structured to:
    receive from the plurality of memories through the port the vehicle component and spare component identifiers associated with the plurality of vehicle components and spare components;
    read from the portion of the second identifiers memory the second list of type-approved vehicle component and spare component identifiers;
    detect if a received vehicle component and spare component identifier from the second identifiers memory is not included in the second list of type-approved vehicle component and spare component identifiers; and
    generate an alarm signal in response to detecting that a received vehicle component and spare component identifier is not included in the second list.

8. A circuit for vehicles having a plurality of vehicle components and spare components, the circuit comprising:
a plurality of memories, each memory associated with a respective one of the vehicle components and spare components, each memory of the plurality of memories configured to store a respective unique identifier associated with the vehicle component and a respective unique identifier associated with each spare component that has replaced the vehicle component;
a first identification memory configured to store identification data associated with respective vehicle components and spare components;
a first processor configured to be coupled to the first identification memory and the plurality of memories of the vehicle components and spare components and to verify that the vehicle components and spare components by comparison with the first identification memory are authorized vehicle components and spare components and, if not, to disable the vehicle; and a communication network configured to provide a direct wired connection to the plurality of memories to the processor.

9. The circuit of claim 8, wherein each memory of the plurality of memories is structured to store identification data that includes the vehicle component identifier and spare component identifiers and at least one of the following: a date of installation of the vehicle component and spare component on the vehicle, a name of a facility performing installation of the vehicle component and spare component on the vehicle, a name of a person performing the installation of the vehicle component and spare component on the vehicle, a version of software used to update the memory associated with the vehicle components and spare components, a name of a proprietor of the software that operates the processor, and a date of the last vehicle service and a name of the facility performing the last vehicle service.

10. The circuit of claim 9, further comprising a port structured to provide electronic access to the plurality of vehicle components and spare components from an exterior of the vehicle, and a device structured to connect to the port and to electronically access the plurality of vehicle components and spare components, the device including a second identification memory structured to store type-approved vehicle component and spare component identifiers, and a second processor structured to receive from the plurality of vehicle components and spare components respective identifiers associated with each of the vehicle components and spare components, to read from the second identification memory coupled to the second processor the type-approved vehicle component and spare component identifiers, to determine if the type-approved vehicle component and spare component identifiers in the second identification memory are not associated with a received vehicle component and spare component identifier associated with a vehicle component and spare component, and to generate an alarm signal in response to determining that a received vehicle component and spare component identifier associated with a vehicle component and spare component is not included in the type-approved vehicle component and spare component identifiers read from the second identification memory coupled to the second processor.

11. The circuit of claim 10, wherein each memory of the plurality of memories comprises an electronic semiconductor memory on each vehicle component and spare component, the electronic semiconductor memory being configured to store the vehicle component and spare component identifiers, and at least one of a date of installation of the vehicle component or spare component on the vehicle, a name of a facility performing installation of the vehicle component or spare component on the vehicle, a name of a person performing the installation of the vehicle component or spare component on the vehicle, a version of software used to update the electronic semiconductor memory, a name of proprietor of a software that operates the processor, a date of the last vehicle service and a name of a facility performing the service, and an identifier associated with a type-approved vehicle component or type-approved spare component to replace the respective vehicle component.

12. The circuit of claim 8, wherein the first processor is configured to provide the alarm signal and prevent operation of at least one of the vehicle and the respective vehicle component or spare component determined to be unauthorized.

* * * * *